(12) United States Patent
Howell

(10) Patent No.: US 12,234,168 B2
(45) Date of Patent: Feb. 25, 2025

(54) RAINWATER PROCESSING SYSTEM AND PROCESSING STEPS FOR PRODUCING POTABLE FUNCTIONAL WATER

(71) Applicant: Heart Water, L.L.C., Cedar Park, TX (US)

(72) Inventor: Jon Marc Howell, Cheshire, OR (US)

(73) Assignee: Heart Water Inc., Cedar Park, TX (US)

( * ) Notice: Subject to any disclaimer, the term of this patent is extended or adjusted under 35 U.S.C. 154(b) by 0 days.

(21) Appl. No.: 18/301,001

(22) Filed: Apr. 14, 2023

(65) Prior Publication Data

US 2023/0249997 A1     Aug. 10, 2023

Related U.S. Application Data

(63) Continuation of application No. 17/328,280, filed on May 24, 2021, now Pat. No. 11,661,363.

(51) Int. Cl.
| | |
|---|---|
| *C02F 1/78* | (2023.01) |
| *C02F 1/00* | (2023.01) |
| *E03B 3/03* | (2006.01) |
| *C02F 103/00* | (2006.01) |
| *C02F 103/02* | (2006.01) |

(52) U.S. Cl.
CPC ............ *C02F 1/78* (2013.01); *C02F 1/001* (2013.01); *E03B 3/03* (2013.01); *C02F 2103/001* (2013.01); *C02F 2103/023* (2013.01); *C02F 2209/02* (2013.01); *C02F 2209/06* (2013.01); *C02F 2209/11* (2013.01)

(58) Field of Classification Search
None
See application file for complete search history.

(56) References Cited

U.S. PATENT DOCUMENTS

| | | | |
|---|---|---|---|
| 4,005,025 A | 1/1977 | Kinstedt | |
| 5,679,257 A | 10/1997 | Coate et al. | |
| 6,405,900 B1 * | 6/2002 | Kown | B67D 1/0021 |
| | | | 222/1 |
| 7,638,047 B1 * | 12/2009 | Jones | C02F 1/288 |
| | | | 210/252 |

(Continued)

FOREIGN PATENT DOCUMENTS

| | | |
|---|---|---|
| CN | 103726566 A | 4/2014 |
| CN | 205171636 U | 4/2016 |

(Continued)

*Primary Examiner* — Chester T Barry
(74) *Attorney, Agent, or Firm* — Weisberg I.P. Law, P.A.

(57) ABSTRACT

A method and rainwater processing system are disclosed. According to one aspect, a method includes collecting rainwater, filtering the collected rainwater, and ozonating the filtered collected rainwater to produce potable water. The method includes diverting a portion of the collected rainwater to a test chamber and testing by sensors the diverted portion of the collected rainwater to produce a valve control signal. Responsive to the valve control signal, a valve is opened to channel collected rainwater to a collection tank and filtered. The method includes ozonating the filtered collected rainwater to produce potable water. A functional water may be prepared by adding a substance to the potable water within a processing tank. The functional water may be carbonate and ozonated.

12 Claims, 7 Drawing Sheets

(56) References Cited

U.S. PATENT DOCUMENTS

| | | |
|---|---|---|
| 8,246,829 B2 | 8/2012 | O'Reagan, Jr. |
| 9,243,841 B2 | 1/2016 | Lu et al. |
| 9,469,557 B1 | 10/2016 | Baird |
| 11,148,104 B1 | 10/2021 | John |
| 2001/0045381 A1* | 11/2001 | Okada .................. B67D 1/0014 |
| | | 222/189.06 |
| 2004/0200542 A1* | 10/2004 | Kruger ...................... E03B 3/03 |
| | | 141/126 |
| 2005/0173336 A1 | 8/2005 | Arnaud |
| 2006/0021953 A1* | 2/2006 | LeCraw .................... C02F 9/20 |
| | | 210/275 |
| 2008/0272064 A1 | 11/2008 | Leonard |
| 2009/0075820 A1 | 3/2009 | Lloyd |
| 2013/0193079 A1 | 8/2013 | Booth et al. |
| 2013/0284647 A1 | 10/2013 | Briscoe |
| 2014/0209544 A1* | 7/2014 | Poffet ....................... C02F 1/68 |
| | | 210/749 |
| 2016/0009568 A1* | 1/2016 | Howell ................ G05D 7/0635 |
| | | 700/282 |
| 2021/0213388 A1* | 7/2021 | Heijnen ............... B01D 69/082 |
| 2021/0347623 A1* | 11/2021 | Fantappie ....... B01F 23/237611 |

FOREIGN PATENT DOCUMENTS

| | | |
|---|---|---|
| EP | 0714668 B1 | 5/2003 |
| EP | 1652823 A2 | 5/2006 |
| JP | 2005502767 A | 1/2005 |
| PT | 104099 B | 12/2008 |
| WO | 9631130 A2 | 10/1996 |
| WO | 2007008543 A2 | 1/2007 |

\* cited by examiner

Stage II

Stage III

RAINWATER PROCESSING SYSTEM AND PROCESSING STEPS FOR PRODUCING POTABLE FUNCTIONAL WATER

CROSS-REFERENCE TO RELATED PATENT APPLICATION

This application is a continuation of and claims priority to U.S. Utility patent application Ser. No. 17/328,280, filed on May 24, 2021, now U.S. Pat. No. 11,661,363, entitled A RAINWATER PROCESSING SYSTEM AND PROCESSING STEPS FOR PRODUCING POTABLE FUNCTIONAL WATER, the entirety of which is incorporated herein by reference.

FIELD

The present disclosure relates to processing rainwater to produce functional water.

BACKGROUND

Collection and use of rainwater for drinking, bathing and cooking, as well as other uses, predates written history and still occurs today. Modern systems also provide filtering and disinfecting of rainwater for drinking, bathing and cooking.

SUMMARY

The techniques of this disclosure generally relate to processing rainwater. In particular, a method and rainwater processing system are disclosed. According to one aspect, a method includes collecting rainwater, filtering the collected rainwater, and ozonating the filtered collected rainwater to produce potable water. The method includes preparing a functional water, the preparing including adding a salt concentrate to at least a portion of the potable water within a processing tank to create a mixture. The functional water may be obtained from the mixture.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
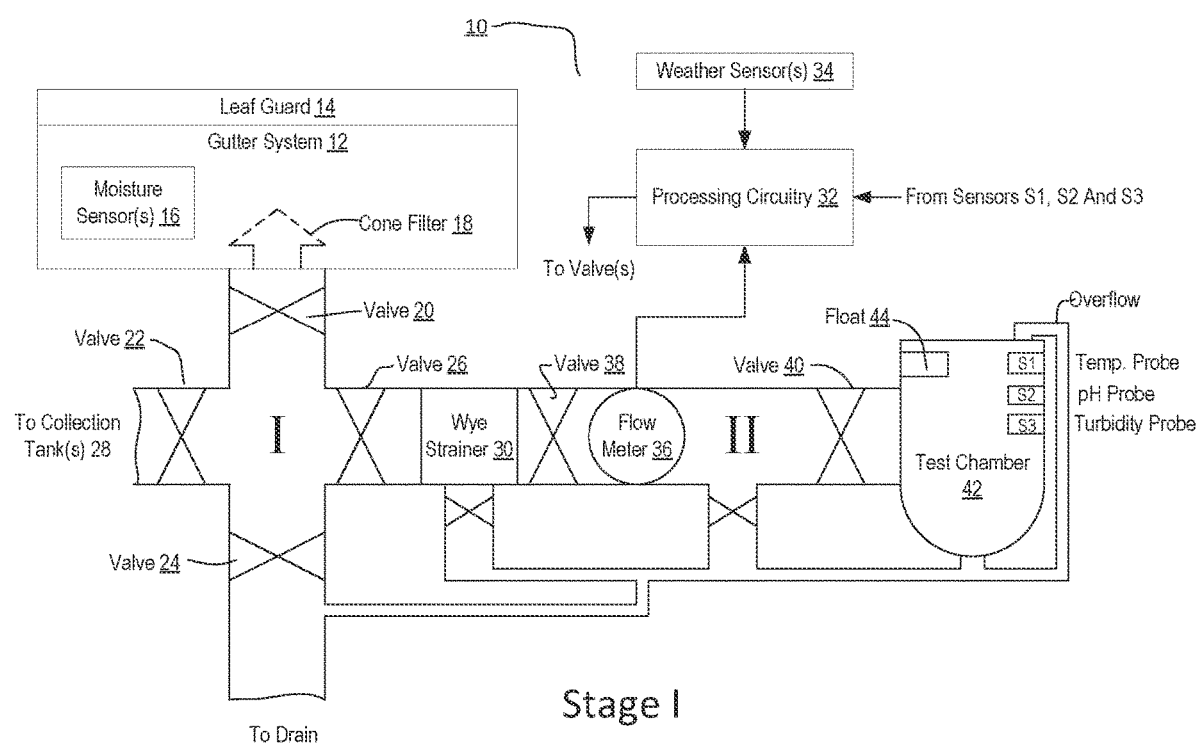
FIG. 1 illustrates one example of a first stage of a rainwater processing system constructed according to principles set forth herein.

Before describing in detail exemplary embodiments, it is noted that the embodiments reside primarily in combinations of apparatus components and processing steps related to processing rainwater to produce a functional water. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

FIG. 1 illustrates a collecting and testing stage (Stage I) of a rainwater processing system 10 that includes a gutter system 12 that optionally is covered by a leaf guard 14. The gutter system 12 may comprise one or more gutters as well as one or more moisture sensors 16. The moisture sensors 16 sense the presence of water in the gutters of the gutter system 12. The rainwater collected by the gutter system 12 of the rainwater collection system 10 may be filtered by a cone filter (or other shaped filter) 18 and channeled to a valve 20. When the valve 20 is open, the collected rainwater flows through the filter 18 and the valve 20 and enters a common region I. The common region 1 is coupled to a valve 22, a valve 24, and a valve 26. When the valve 22 is open, rainwater flows to collection tanks 28. When the valve 24 is open, rainwater flows to a drain, where it may be discarded. This enables an operator to drain a certain portion of the water collected by the gutter system 12, before closing valve 24 and opening valve 22 and/or valve 26. The valve 26 may be opened to channel collected rainwater to a Wye strainer 30. A purpose of the Wye strainer 30 may be to remove any debris that might otherwise obstruct the operation of downstream equipment.

One or more of the valves 22, 24 and 26 may be manually controlled or motor driven to open or close in response to control signals received by processing circuitry 32. Processing circuitry 32 may be responsive to signals from a weather sensor 34. For example, when a weather sensor 34 senses rain (or high humidity, for example), the processing circuitry may send a control signal to open valve 20. The processing circuitry 32 may also be in electrical communication with the moisture sensors 16 to open valve 20 when the moisture sensors 16 sense rainwater in the gutters of the gutter system 12.

When the valve 26 is open, water flows through the Wye strainer 30 to a flow meter 36 via an optional valve 38. The flow meter may measure the rate of water flow to a second common area II and send a signal indicative of the measured rate to the processing circuitry 32. A valve 40 may be opened manually or under the control of the processing circuitry 32 to channel water from the second common region II to a test chamber 42. A purpose of the test chamber 42 may be to test rainwater quality. The test chamber 42 may have a float 44 that determines a level of rainwater in the test chamber 42. The test chamber 42 may have one or more sensors, S, such as temperature probe (sensor) S1, pH probe S2 and turbidity probe S3. Electrical signals indicative of sensed parameters such as temperature, pH and turbidity may be sent from the sensors S to the processing circuitry 32 where the electrical signals may be processed to control one or more valves and/or to generate a display indicative of a parameter such as a temperature, pH or turbidity of the water in the test chamber 42. Overflow of rainwater in the test chamber 42 may be channeled to the drain.

Thus, in some embodiments, a portion of rainwater captured by the gutter system 12 may be drained in a first step, a portion of the rainwater remaining after the draining may be tested in a second step and the remaining amount of collected water not that is not drained or channeled to the test chamber 42 may be channeled to the collection tanks 28. Overflow from the test chamber 42, if any, may be channeled to the drain. Any water channeled to the drain may be discarded or further processed in a process that is beyond the scope of this disclosure. In some embodiments, piping between a main gutter downspout of the gutter system 12 that channels rainwater to the first common region I may have a diameter of six to 24 inches, for example. In contrast, piping downstream from the Wye strainer 30 may have a diameter of two inches or less, for example. In some embodiments, piping from the first common region Ito the collection tanks 28 has a diameter of six inches, for example. The diameter of the piping may be selected based on, for example, the size of the installation of the rainwater processing system 10 and the volume of rainwater to be processed.

Figure 2:
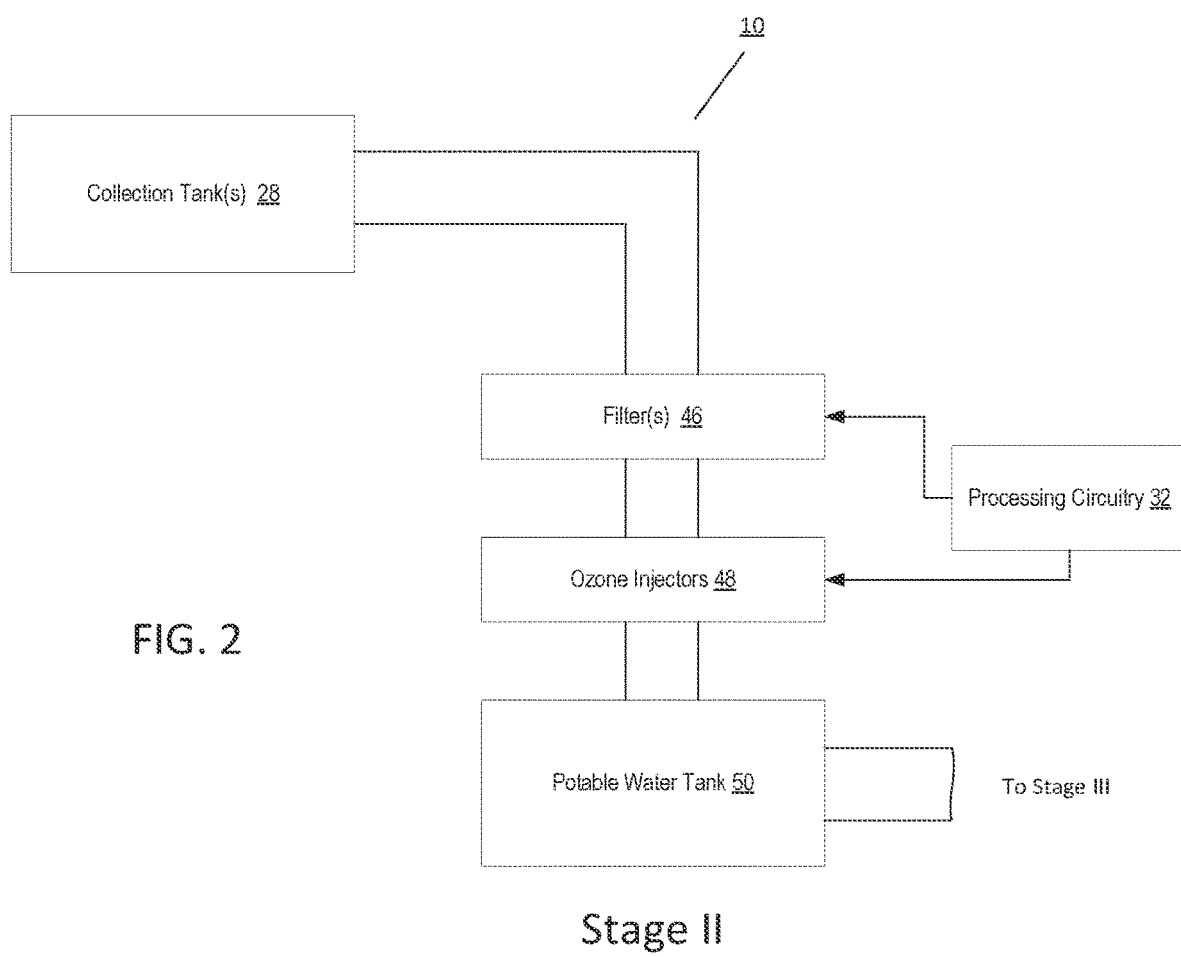
FIG. 2 illustrates one example of a second stage of a rainwater processing system constructed according to principles disclosed herein.

FIG. 2 illustrates a potable water processing stage (Stage II) of the rainwater processing system 10 and also illustrates the one or more rainwater collection tanks 28. Rainwater may be retained in rainwater collection tanks 28 for a period of time before further processing to allow time for sedimentation to occur. The rainwater in the rainwater collection tanks before Stage II processing is referred to herein as raw water. After sedimentation has been allowed to occur, the raw water may be filtered by one or more filters 46 which filter the raw water to remove substances such as certain living pathogens such as Giardia and Cryptosporidium and compounds such as perfluoroalkyl and polyfluoroalkyl substances (PFAS). The filtered water from the filters 46 may then be subject to injection of ozone into the filtered water by the ozone injectors 48, also referred to herein as ozone generator 48. Injection of the ozone into the filtered water occurs over a period of time sufficient to achieve disinfection at a temperature (such as room temperature, a colder temperature or a warmer temperature.) The amount of ozone injected into the water (which may be expressed in milligrams of ozone per liter of water, or in parts per million) and the duration of time during which the ozone is injected may be according to standards prescribed by a locality where the water is to be consumed. The ozone injection may occur in contact tanks that are at least partially lined with Schedule 80 PVC.

The ozonated filtered water may then be collected into one or more potable water tanks 50. Potable water may be considered drinkable water if filtered and ozonated to meet drinkable water quality standards of the locality where the rainwater is to be used.

Figure 3:
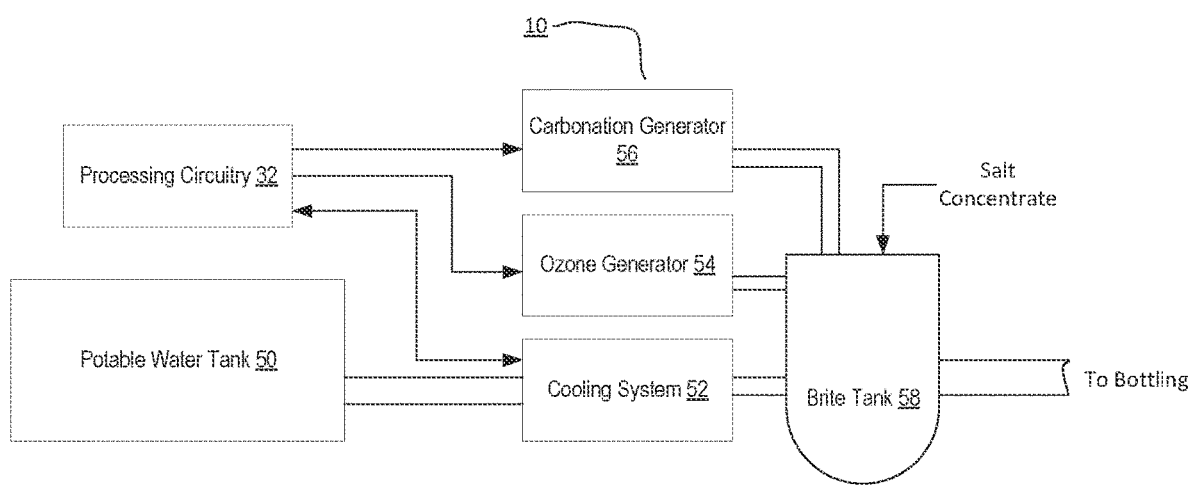
FIG. 3 illustrates one example of a third stage of a rainwater processing system configured to produce a functional water as described below.

FIG. 3 illustrates a post-processing stage (Stage III) of the rainwater processing system 10. Stage III may be employed to provide functional water, i.e., water that performs a function above and beyond the mere quenching of thirst and water replacement that is achieved by plain potable water. For example, functional water may include water having vitamins, minerals and/or salts (such as Himalayan salts). Stage III may include a cooling system 52, an ozone generator 54, a carbonation generator 56 and a Brite tank 58. The cooling system 52 may be in close proximity to the Brite tank 58 so as to cool the contents of the Brite tank or may precede the Brite tank 58 to cool potable water from the potable water tanks 50 that is channeled to the Brite tank 58. The ozone generator 54 is configured to generate ozone to inject into water in the Brite tank 58 in order to disinfect water in the Brite tank 58 in cases where the carbonation generator 56 is used to carbonate the contents of the Brite tank 58 to produce carbonated water. The Brite tank 58 may be of the kind known by brewers of beer.

In some embodiments, a salt concentrate process, described with reference to FIG. 5 below, may be employed to produce a salt concentrate that is introduced into the Brite tank 58. This salt concentrate may include Himalayan salt crystals dissolved into potable water. The salt concentrate may be introduced to the Brite tank 58, where it may be diluted by potable water from the cooling system 52. This mixture of salt concentrate and potable water may be carbonated by injection of carbonation from the carbonation generator 54, in some embodiments. The carbonation process may take a long time such as up to several days. The carbonated mixture may also be ozonated with ozone from the ozone generator 54 to disinfect the carbonated mixture. The ozonating may involve injecting ozone into the carbonated mixture to achieve an ozone concentration of between 0.2 and 0.4 milligrams per liter for a predetermined minimum time that may be prescribed by law or local standards or determined by experimentation. The ozonated, carbonated mixture is a functional water that may be bottled and later consumed by drinking. In some embodiments the functional water may be bottled in aluminum bottles or bottles of another eco-friendly, recyclable material that inhibits interaction with the functional water.

Note that the piping between the various components described with reference to FIGS. 1-3, as well as the interior surfaces of the collection tanks 28 and potable water tanks 50 may consist of or include Schedule 80 PVC because, among other reasons, Schedule 80 PVC is non-corrosive and does not contaminate the potable water. In particular, the Brite tank may be at least partially lined with Schedule 80 PVC, although typically, the Brite tank interior may be stainless steel.

Figure 4:
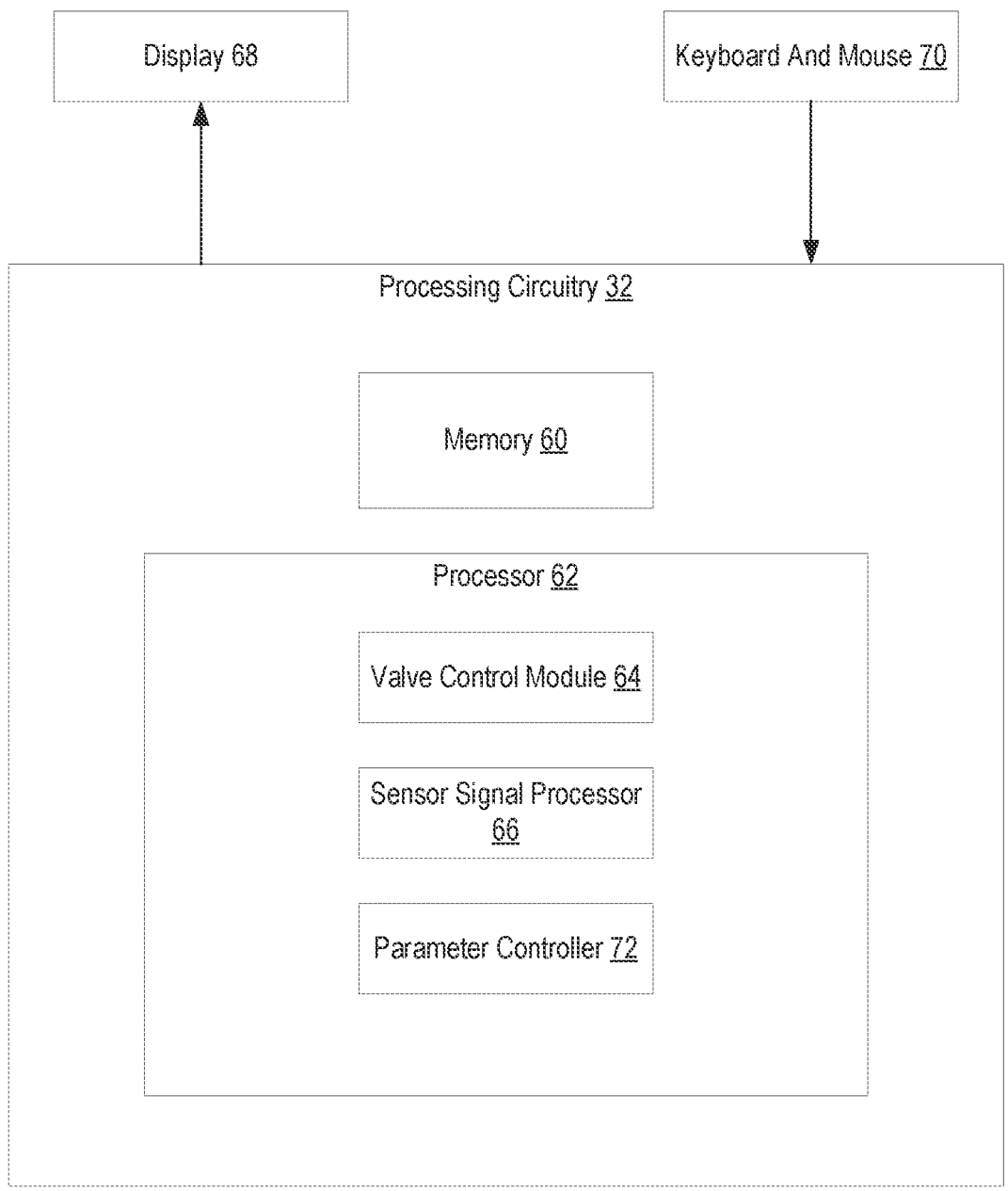
FIG. 4 is a block diagram of processing circuitry configured to be used in a rainwater processing system according to principles set forth below.

FIG. 4 is a block diagram of one embodiment of the processing circuitry 32 which may include a memory 60 and a processor 62. The memory 60 may be configured to store data and computer code instructions that when executed by the processor 62 cause the processor 62 to perform functions attributed herein to the processing circuitry 32. The processor 62 may include a valve control module 64 that is configured to determine which valve to open or close at any given time or during a time of draining the water (valve 20 and valve 24 open, other valves closed), followed by testing the water (valves 26, 38 and 40 open, valve 24 closed), followed by channeling water to the collection tanks 28 (valve 22 open, valve 24 closed).

The valve control module may be configured to generate a motor control signal to control motors that open or close the various valves 20, 22, 24, 26, 38 and 40 (and possibly other valves, in some embodiments), responsive to signals from the weather sensors 34 or sensors S. The valve control module may thereby open and control the various valves shown in FIG. 1 in response to, for example, the presence of rain as detected by weather sensors 34, or periodically or occasionally for testing of rainwater collected by the gutter system 12 in the test chamber 42. Any one or more of the various valves 20, 22, 24, 26, 38 and 40 may be opened or closed, individually or jointly, by the valve control module 64 of the processing circuitry 32.

For example, when a portion of the collected rainwater in the test chamber 42 fails a test, as detected by a signal from a sensor S exceeding or falling below a threshold, the valve 24 may be opened and the valve 22 may be closed to prevent water of insufficient quality from entering the collection tanks 28. Accordingly, the processor 62 may also include a sensor signal processor 66 to evaluate signals from sensors S, such as one or more of sensors S1, S2, S3 and/or other sensors. The sensor signals may be evaluated by the sensor signal processor 66 by comparing a sensor signal to a predetermined threshold. For example, a pH of the water in the test chamber 42 may be compared to a pH level specified by a city ordinance or the Environmental Protection Agency, EPA, for example, to determine whether the rainwater is of sufficient quality to channel to the collection tanks 28. In some embodiments, the measuring of parameters by the sensors S may begin after a portion of the rainwater is drained, the valve 24 is closed and valve 26, 38 and 40 are opened. The testing may be made on a new sample of rainwater channeled to the test chamber 42 every 10 minutes during rainfall as detected by the weather sensors 34 or with some other periodicity. In some embodiments, the test chamber has an interior volume sufficient to hold approximately 2.5 gallons of functional water or less.

The sensor signal processor 66 may also convert or map the amplitude of a sensor signal to a scale. For example, an amplitude of a sensor signal from the temperature probe S1 may be mapped to a temperature scale that ranges from freezing to boiling temperature or some other range of temperatures. The temperature indicated by the sensor signal from the temperature probe S1 as well as the temperature scale may be displayed on a display 68 in communication with the processing circuitry 32. Similarly, the sensed pH may be displayed on a pH scale and/or the turbidity may also be displayed on a scale.

An operator may control the display 68 via a keyboard and mouse 70. The display 68 and keyboard/mouse 70 may constitute a graphical user interface (GUI) that enables the operator to control the valves described above as well as to enable the operator to control parameters including one or more of the following: an amount or type of filtering of filter 46, an amount of ozone injected by ozone injectors 48, the temperature of the cooling system 52, an amount of ozone injection by the ozone generator 54 and/or an amount of carbonation by the carbonation generator 54. Thus, the processing circuitry 32 may comprise a parameter control module 72 that operates under control of operator instructions or autonomously to control the valves, temperature, ozonation, and carbonation as described above. Note that the amount of ozone injected by the ozone injectors 48 may be to achieve a different ozone concentration than the ozone concentration achieved by the ozone generator 54.

Note that the processing circuitry 32 may include one or more distinct integrated circuits. For example, in some embodiments, the processing circuitry 32 may actually be housed in single housing or may include processing circuitry located in multiple separate housings which may be in different locations within a facility housing components of the rainwater processing system 10.

Figure 5:
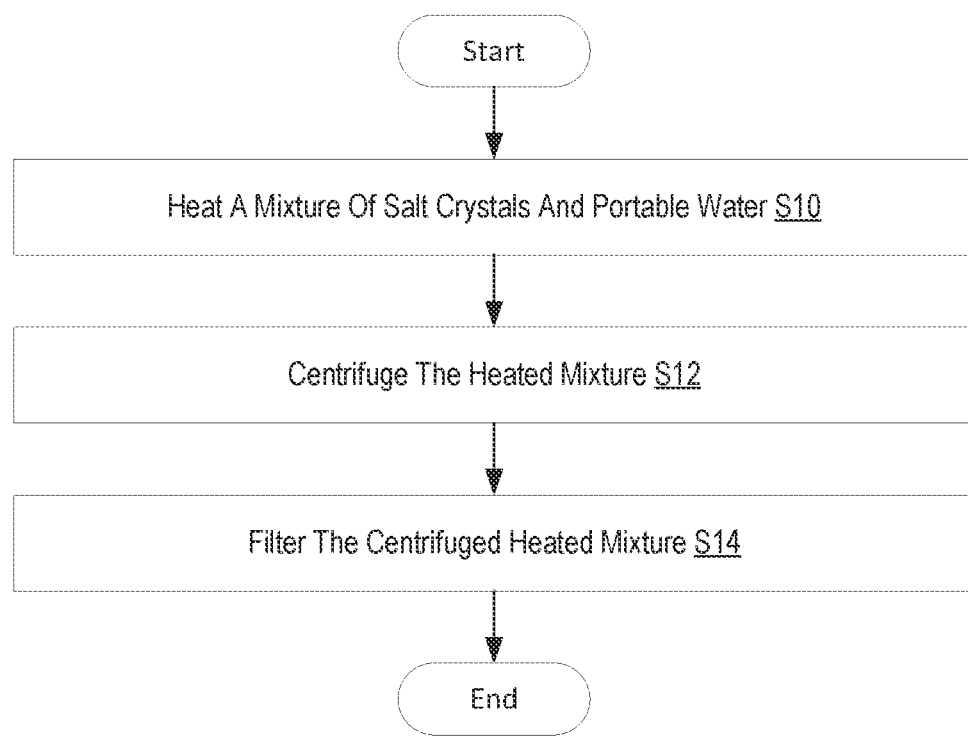
FIG. 5 is a flowchart of an example process for preparing a salt concentrate for use in preparing a functional water according to principles set forth herein.

FIG. 5 is a flow chart of one example process for preparing a salt concentrate to add to the Brite tank 58 in order to prepare the functional water. The process includes heating a mixture of salt crystals and potable water to at least a specified minimum temperature (Block S10). Then, the heated mixture is centrifuged (Block S12). The centrifuged heated mixture is then filtered to remove any undissolved salt crystals (Block S14).

Figure 6:
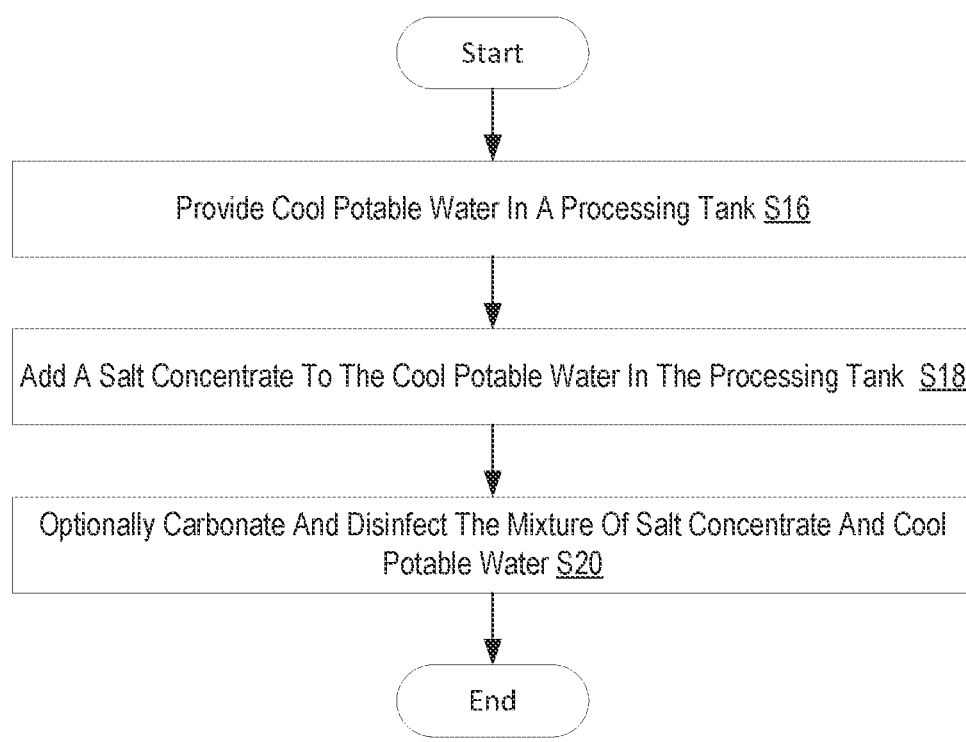
FIG. 6 is a flowchart of an example process for preparing a functional water in a processing tank according to principles disclosed herein.

FIG. 6 is a flowchart of one example process for preparing a functional water. The process includes providing cooled potable water in a processing tank such as a Brite tank 58 (Block S16). The potable water may be cooled by the cooling system 52. The process also includes adding a salt concentrate to the cooled potable water in the processing tank (Block S18). In an alternative embodiment, the salt concentrate is added to the processing tank before adding cooled potable water to the processing tank. The mixture of the salt concentrate and potable water in the processing tank may then be optionally carbonated by carbonation generator 56 and ozonated by the ozone generator 54 (Block S20).

Figure 7:
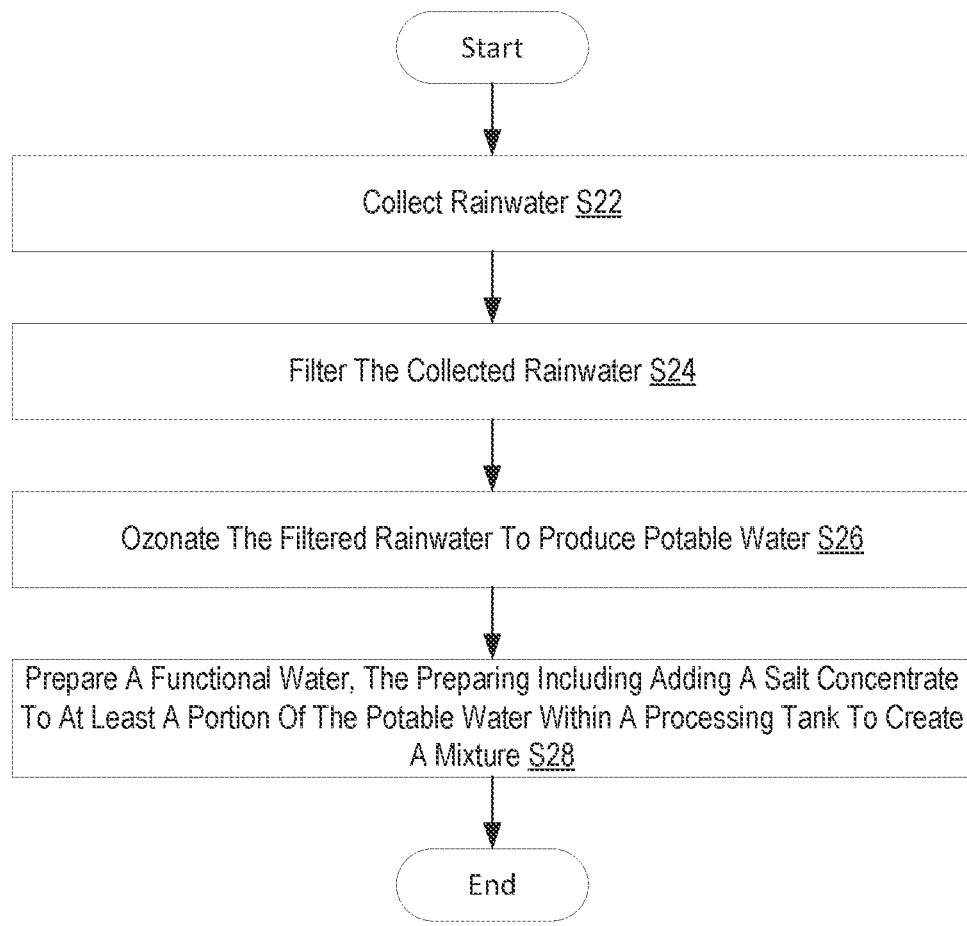
FIG. 7 is a flowchart of an example for preparing a functional water according to principles set forth below.

FIG. 7 is a flowchart of one example process for preparing a functional water. The process includes collecting rainwater (Block S22). The process also includes filtering the collected rainwater (Block S24), and ozonating the filtered rainwater to produce potable water (Block S26). The process also includes preparing a functional water, the preparing including adding a salt concentrate to at least a portion of the potable water within a processing tank to create a mixture (Block S28).

According to one aspect, a method for processing rainwater is provided. The method includes collecting, via the gutter system 12, rainwater, and filtering, via filters 46, the collected rainwater and ozonating, via the ozone injectors 48, the filtered collected rainwater to produce potable water. The method also includes preparing a functional water, the preparing including adding a salt concentrate to at least a portion of the potable water within a processing tank 58 to create a mixture.

According to this aspect, in some embodiments, the method also includes cooling, via the cooling system 52, the potable water before the potable water is added to the processing tank 58. In some embodiments, the method also includes cooling the mixture within the processing tank 58. In some embodiments, the method further includes carbonating, via the carbonation generator 56, the mixture and ozonating, via the ozone generator 54, the mixture. In some embodiments, the ozonating is configured to provide an ozone concentration between 0.2 and 0.4 milligrams per liter of carbonated potable water. In some embodiments, the method also includes preparing the salt concentrate by: heating a mixture of salt crystals and potable water, centrifuging the heated mixture, and filtering the centrifuged heated mixture. In some embodiments, collecting rainwater further includes: sensing rain by a rain sensor 34, and opening at least one valve 20, 22, 24, and 26 to channel collected rainwater into one of a plurality of channels. In some embodiments, opening at least one valve includes opening a valve 24 to channel at least some of the collected rainwater to a drain. In some embodiments, opening at least one valve includes opening a valve 26 to channel at least some of the collected rainwater to a test chamber 42. In some embodiments, opening at least one valve includes opening a valve 22 to channel at least some of the collected rainwater to at least one collection tank 28.

According to another aspect, a rainwater processing system 10 includes a rainwater collection system configured to collect rainwater in a collection tank 28. A filter 46 is configured to filter the collected rainwater to produce filtered rainwater. An ozone generator 48 is configured to ozonate the filtered rainwater to produce potable water. A processing tank 58 is configured to hold a mixture of a salt concentrate and the potable water. A cooling system 52 is configured to cool the potable water before or after adding the salt concentrate to create a cooled mixture.

According to this aspect, in some embodiments, the rainwater processing system 10 further includes a rain sensor 34 to determine when to channel the collected rainwater into a collection tank 28. In some embodiments, the rainwater processing system 10 further includes carbonating and ozonating equipment 56 ad 54, to carbonate and ozonate the cooled mixture. In some embodiments, the rainwater processing system 10 further includes processing circuitry 32 configured to open a first valve 20 to allow collected rainwater to be channeled to a first common region I. The processing circuitry 32 is further configured to do one of the following: open a second valve 24 to drain a portion of the collected rainwater via the first common region I; open a third valve 26 to channel a portion of the collected rainwater to a test chamber 42 via the first common region I; and open a fourth valve 22 to channel a portion of the collected rainwater to at least one collection tank 28 via the first common region I. In some embodiments, the processing circuitry 32 is further configured to control the ozone generator 48 to achieve an ozone concentration of between 0.2 and 0.4 milligrams per liter of filtered rainwater. In some embodiments, the processing circuitry 32 is responsive to at least one of a temperature sensor S1, a pH sensor S2 and a turbidity sensor S3 to determine when to open the second valve 24 and close the fourth valve 22. In some embodiments, the rainwater processing system further includes a carbonation generator 56 to carbonate the cooled mixture. In some embodiments, the processing circuitry 32 is further configured to control the ozone generator 54 to ozonate the carbonated cooled mixture. In some embodiments, an interior surface of the processing tank 58 is lined with Schedule 80 PVC. In some embodiments, the salt concentrate is preformed from Himalayan salt crystals.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A rainwater processing system, comprising:
   a collection system configured to receive and channel rainwater;
   a test subsystem configured to test a portion of received rainwater channeled by the collection system;
   processing circuitry configured to:
      control a first valve to selectively channel received rainwater to the test subsystem; and
      control a second valve to selectively channel received rainwater to a processing subsystem in response to a result of the test of the portion of received rainwater by the test subsystem; and
      control a third valve to selectively channel received rainwater to at least one of the first valve and the second valve, the third valve being controlled based at least in part on a signal from a weather sensor; and
   the processing subsystem being configured to:
      filter received rainwater;
      ozonate the filtered received rainwater to produce potable water; and
      prepare a functional water by adding a substance to the potable water within the processing tank.

2. The system of claim 1, wherein the processing subsystem is configured to carbonate and ozonate the functional water.

3. The system of claim 2, wherein ozonating the filtered received rainwater includes ozonating the filtered rainwater to have an ozone concentration between 0.2 and 0.4 milligrams per liter.

4. The system of claim 2, wherein the processing subsystem is further configured to cool the potable water before carbonating and ozonating the functional water.

5. The system of claim 1, wherein the test subsystem is configured to test the portion of the received rainwater for at least one of a temperature, a pH, and a turbidity.

6. The system of claim 1, wherein the processing circuitry is further configured to control the third valve based at least in part on a signal from a moisture sensor.

7. The system of claim 1, wherein the processing circuitry is further configured to control the third valve to selectively channel received rainwater to a drain in response to a result of the test of the portion of received rainwater by the test subsystem.

8. The system of claim 1, wherein the collection system includes at least one collection tank to collect the received rainwater.

9. The system of claim 8, wherein the collection tank is configured to enable separation of rainwater from sediment.

10. The system of claim 1, wherein filtering the received rainwater includes removal of at least one of pathogens and toxic substances from the received rainwater.

11. A rainwater processing system, comprising:
processing circuitry configured to:
   open a first valve to allow collected rainwater to be channeled to a first common region, the first valve being opened in response to a signal from a rain sensor; and
   one of:
      open a second valve to channel a portion of the collected rainwater from the first common region to a test chamber; and
      open a third valve to channel a portion of the collected rainwater from the first common region to at least one collection tank via the first common region; and
a processing subsystem configured to:
   filter and ozonate collected rainwater from the collection tank;
   prepare a functional water from the filtered, ozonated rainwater.

12. A rainwater processing system, comprising:
processing circuitry configured to:
   open a first valve to allow collected rainwater to be channeled to a first common region; and
   one of:
      open a second valve to channel a portion of the collected rainwater from the first common region to a test chamber; and
      open a third valve to channel a portion of the collected rainwater from the first common region to at least one collection tank via the first common region; and
a processing subsystem configured to:
   filter and ozonate collected rainwater from the collection tank;
   prepare a functional water from the filtered, ozonated rainwater;
   cool the functional water to create a cooled mixture; and
   carbonate the cooled mixture.

\* \* \* \* \*